US005753996A

United States Patent [19]

Csoknyai

[11] Patent Number: 5,753,996

[45] Date of Patent: May 19, 1998

[54] GAS DISCHARGE LAMP WITH HANDLE CONSTRUCTION

[75] Inventor: George Csoknyai, Orange, Conn.

[73] Assignee: Light Sources, Inc., Orange, Conn.

[21] Appl. No.: 724,260

[22] Filed: Sep. 19, 1996

[51] Int. Cl.[6] .................................. H01J 5/48; G02F 1/48

[52] U.S. Cl. ................................ 313/318.05; 313/318.02; 313/318.06; 362/217; 210/748; 422/24

[58] Field of Search ......................... 313/318.02, 318.05, 313/318.06, 318.09, 318.1, 1, 3, 493, 634; 362/230, 217, 102, 202; 250/436; 210/748; 422/24; 439/617, 612

[56] References Cited

U.S. PATENT DOCUMENTS 728,060 5/1903 Whipple ............................ 313/318.05

4,700,101 10/1987 Ellner et al. ............................... 313/1

*Primary Examiner*—Sandra L. O'Shea
*Assistant Examiner*—Michael Day
*Attorney, Agent, or Firm*—Fattibene and Fattibene; Arthur T. Fattibene; Paul A. Fattibene

[57] ABSTRACT

A gas discharge lamp has opposed end caps for enclosing the sealed end of the glass envelope. One of the end caps is provided with contact pins, and the other end cap is provided with a handle portion. The electrode adjacent the handled end cap is provided with an extended end portion that is mechanically connected to the handle end cap. In the event the handle end cap is loosened or becomes unbonded from the glass envelope, the handled end cap remains mechanically linked to the lamp so that removal or replacement of the lamp can be facilitated by applying a pulling force on the handled end cap.

8 Claims, 1 Drawing Sheet

10
11
11A
11B
12A
12B
12C
12D
14
15
16
17
17A
18
18A
19
19B
19C
19D
20
21
30

GAS DISCHARGE LAMP WITH HANDLE CONSTRUCTION

FIELD OF THE INVENTION

This invention relates generally to gas discharge lamps, e.g. fluorescent or UV type lamps, and more specifically to a gas discharge lamp having an improved handle construction to facilitate the attachment and detachment of such lamp to and from its operating installation.

PROBLEM AND PRIOR ART

Heretofore, gas discharge lamps, e.g. UV type lamps or the like, were constructed so that the contact pins projected outwardly from one end thereof, e.g. as disclosed in U.S. Pat. No. 4,700,101 and U.S. Pat. No. 5,166,527. Such lamps are commonly used in water purification systems such as disclosed in U.S. Pat. No. 4,767,932. In such applications, lamps are required to be removed and/or replaced in case of a malfunction and/or after the lamps are worn. To facilitate removal of such lamp, a suitable handle was generally connected to one end of the lamp. Heretofore, such handles were simply secured to the end of a lamp by adhesive. It has been observed that after extended use in a highly humid and/or heated environment, the handle previously known tended to loosen and/or separate from the lamp when a pulling force was applied thereto. When this occurs, the removal of the lamp becomes exceptionally difficult, thereby requiring in most instances a complete shut-down of the operating system in order to effect the removal and/or replacement of worn lamps.

SUMMARY OF THE INVENTION

An object of this invention is to provide a gas discharge lamp having a handle positively connected to one end thereof in a manner to prohibit separation therebetween when a pulling force is applied thereto.

Another object of this invention is to provide a gas discharge type lamp with a handle which is integrally and positively connected to the lamp structure.

Another object is to provide a gas discharge lamp having a handle connected to the lamp in a positive manner that is relatively simple, positive, and economical in construction and operation.

The foregoing objects and other features and advantages are attained by a gas discharge lamp having a handle positively connected to the end of the lamp opposite the end from which the contact pins project. The handle is integrally formed as a component of the end cap that fits over the sealed end of the lamp tube. The conducting wires connected to the electrode disposed adjacent the sealed end of the lamp in accordance with this invention are extended through the sealed end of the lamp and secured to the base of the end cap to which the handle is integrally formed. The end of the conductor wires, fastened to the base portion of the socket, are sealed or covered by a non-conducting plug or material. Accordingly, the end cap and integrally formed handle is positively connected to the sealed glass portion of the lamp by the extended conductor wires so as to prevent any separation between the handle and the glass portion of the lamp in the event the end cap is loosened from the glass portion of the lamp.

IN THE DRAWINGS

DETAILED DESCRIPTION OF THE PREFERRED EMBODIMENTS

Figures 1, 2, 3:
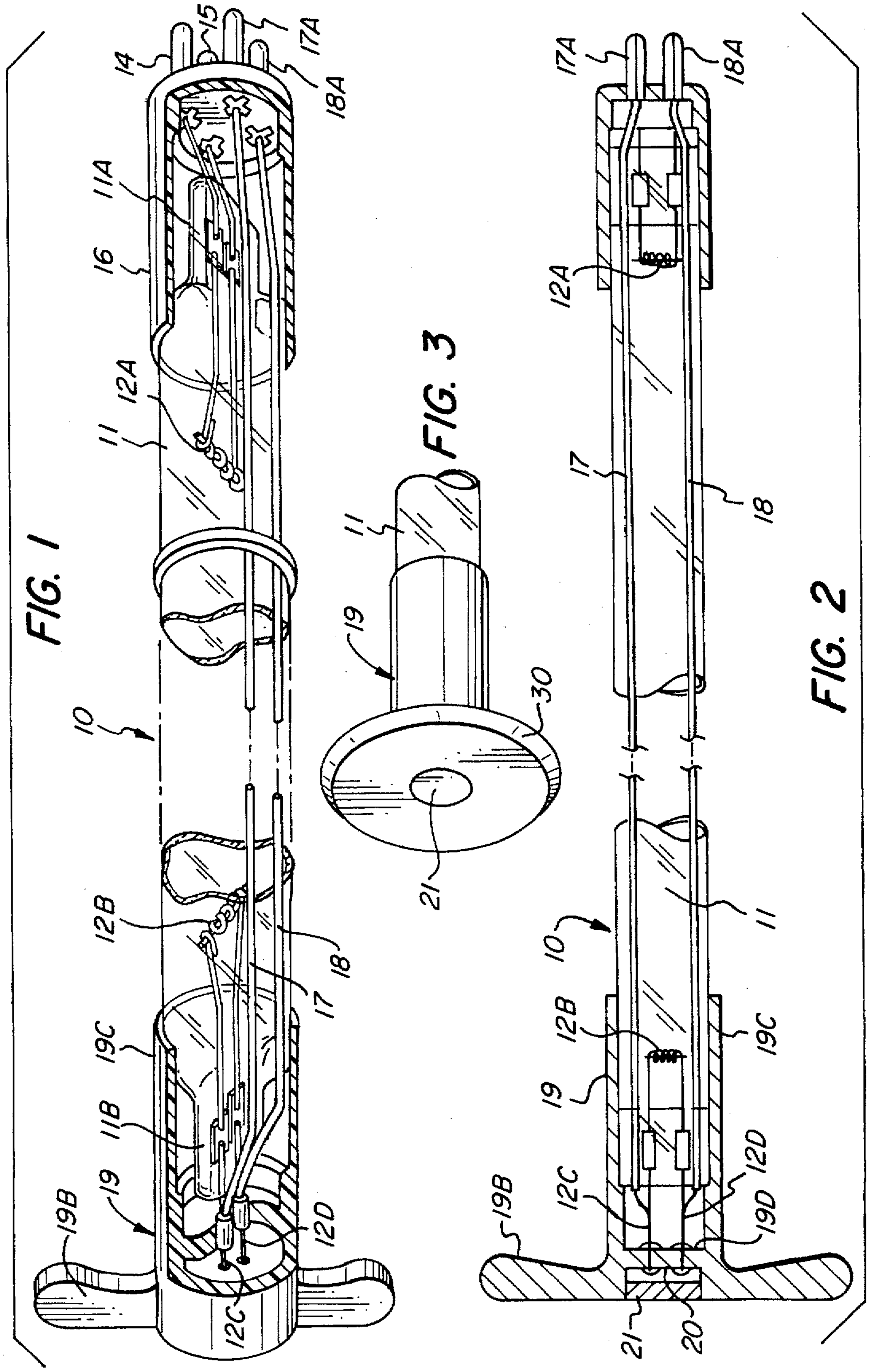
FIG. 1 illustrates a longitudinal side view of a gas discharge lamp embodying the present invention and having parts shown in section.
FIG. 2 is a detailed sectional view of the handled end cap.
FIG. 3 is a detailed view of a modified embodiment.

Referring to the drawings, there is shown in FIG. 1, a gas discharge lamp, e.g. a fluorescent or UV lamp 10. Such lamp includes an elongated glass tube or envelope 11 which is sealed at both ends 11A, 11B, with an electrode 12A, 12B disposed in each end of the sealed tube or envelope 11. As seen in FIG. 1, the ends of the electrode 12A are electrically connected to a pair of end contacts 14 and 15 projecting outwardly of an end cap 16, which is secured to one end of the sealed tube or envelope e.g. by adhesive or other suitable bonding agent. The end of the other electrode 12B are electrically connected by conductor wires 17 and 18, which extend exteriorly of the glass tube or envelope 11, to contacts 17A and 18A projecting outwardly of the end cap 16 in any manner similar to that disclosed in U.S. Pat. No. 4,700,101. It will be understood that the end cap 16 is suitably connected or bonded to the sealed end 11A of the glass tube in a conventional, well-known manner.

In accordance with this invention, there is connected to the other sealed end 11B of the glass tube an end cap 19 having integrally formed or connected thereto a handle 19B. In the illustrated embodiment, the handle 19B is formed as a transverse or wing shaped member which is preferably integrally formed on the end of the end cap 19. It will be understood that the handle 19B may take other shapes, e.g. a knob or wheel 30, as shown in FIG. 3, or other suitable design capable of providing a grip by which one may easily grasp the lamp 10 to provide a pulling or pushing force to facilitate the placement or removal of the lamp 10 from its installed position, e.g. in a water purification system.

The cup portion 19C of the end cap 19 is also secured to the sealed end of the glass tube 11 in the conventional manner. However, in the event that the end cap 19 may separate from the glass tube, as may occur from time to time as has been observed in the past, positive means are provided to mechanically connect the handled end cap 19 to the glass tube 11, so that the lamp 10 can be pulled free from its connected socket even if the bonded connection between the end cap 19 and glass tube 11 fails. This is attained by extending end wire 12C and 12D of the electrode 12B through the end wall 19D of the end cap 19 and securing the extended portions of the end wires 12C and 12D directly to the end wall 19D, as best seen in FIG. 2. By securing the extended portions of the end wires 12C and 12D directly to the end wall 19D of the end cap 19, it will be apparent that the end cap 19 is mechanically connected in a positive manner directly to the glass envelope 11. Thus, even if the bonding or connection between the cylindrical or cup portion 19C of the end cap 19 and the glass tube 11 is loosened or becomes unbonded, a pulling force applied on handle 19B of the end cap 19 is transmitted through the wire extensions 12C and 12D to effect the removal of the lamp 10 from its socket.

In the illustrated embodiment, the end wall 19D on the exterior portion thereof is recessed at 20 to circumscribe the attachment area of the wire extensions 12C and 12D. A suitable non-conducting plug or sealing button 21 is fitted to the recess to seal the point of connection of the wire extensions 12C and 12D to the end wall 19D, and insulates the wire connections from any contact being had with the secured electrode wires 12C and 12D. It will be understood that the insulated wire conductors 17 and 18 are sliced to or suitably electrically connected to each of the extended portions 12C and 12D for connecting the electrode 12A to its pin contacts, e.g. 17A, 18B.

From the foregoing description, it is evident that the end cap 19 and associated handle 19B is positively mechanically connected to the glass envelope 11 through the extended portions 12C and 12D of the electrode 12B. Regardless of the condition of the bond between the end cap 19 and the glass envelope 11, the lamp 10 can still be readily removed by a pulling force being applied to the handled end cap 19.

While the invention has been described with respect to a particular embodiment thereof, variations and modifications may be made without departing from the spirit or scope of the invention.

What is claimed is:

1. A gas discharge lamp comprising:

an elongated glass envelope, said envelope being sealed at the opposed end thereof, a pair of electrodes disposed within said glass envelope, each of said electrodes being disposed adjacent a sealed end of said glass envelope, an end cap secured to one sealed end of said envelope, a plurality of contact pins projecting outwardly of said end cap, each of said electrodes being electrically connected to its corresponding contact pin, a second end cap connected to the other sealed end of said envelope, said second end cap including a handle portion connected to said second end cap and, to provide a grip for applying a force on said lamp, and means for mechanically connecting one of said electrodes to said second end cap to prevent any separation between said second end cap and said envelope in the event said second end cap is loosened from said envelope for any reason.

2. A gas discharge lamp as defined in claim 1 wherein said means comprises:

said one electrode having an extended end portion projecting outwardly of the adjacent sealed end of said glass envelope, said extended end portion of said one electrode being connected to said second end cap.

3. A gas discharge lamp as defined in claim 2 and including a means for electrically insulating the connection of said extended portion of said one electrode to said second end cap.

4. A gas discharge lamp as defined in claim 2 and including an electrical conductor connected to the extended portion of said second electrode, said electrical conductor extending exteriorly of said glass tube for electrically connecting said second electrode to its corresponding contact pins projecting outwardly of said end cap.

5. A gas discharge lamp comprising:

an elongated glass envelope, said glass envelope being sealed at each end, a pair of electrodes disposed within said envelope, each of said electrodes being disposed adjacent the respective sealed ends of said glass envelope, a first end cap connected to a sealed end of said envelope, a plurality of contact pins projecting outwardly of said first end cap, one of said electrodes disposed within said sealed envelope being electrically connected to its corresponding contact pins, a second end cap connected to the other end of said glass envelope, said second end cap including a cylindrical cup portion having an end wall secured to the other sealed end of said glass envelope, said second electrode disposed within said sealed envelope having extended end portions through said other end of said glass envelope, said extended portions of said second electrode being connected to said end wall, and a handle portion connected to said second end cap to provide a grip for exerting a force on said lamp.

6. A gas discharge lamp as defined in claim 5 and including:

said end wall of said second end cap having an external recess formed therein, said external end portions of said second electrode being secured to said end wall within said recess, and an end plug for sealing said recess.

7. A gas discharge lamp as defined in claim 6, and including:

an insulated wire conductor connected to the extended end portion of said second electrode externally of said other sealed end of said glass envelope and within said second end cap, said insulated conductor extending externally of said glass envelope for electrically connecting said second electrode to its corresponding contact pin projecting outwardly of said first end cap.

8. A lamp comprising:

a glass envelope having a sealed end, an electrode disposed within said glass envelope adjacent said sealed end, an end cap having a connected handle portion connected to said end cap and to provide a grip for applying a force on said envelope, means for securing said end cap to said sealed end of said glass envelope, said electrode having an extended portion projecting through said sealed end of said glass envelope, said extended portion of said electrode being connected to said end cap to prevent any separation between said end cap and said glass envelope in the event said means securing said end cap to said sealed end of said glass envelope fails.

* * * * *